Jan. 5, 1932.  H. K. WILLIAMS ET AL  1,840,268
VARIABLE SPEED HYDRAULIC POWER TRANSMISSION MECHANISM
Filed May 23, 1929   2 Sheets-Sheet 1
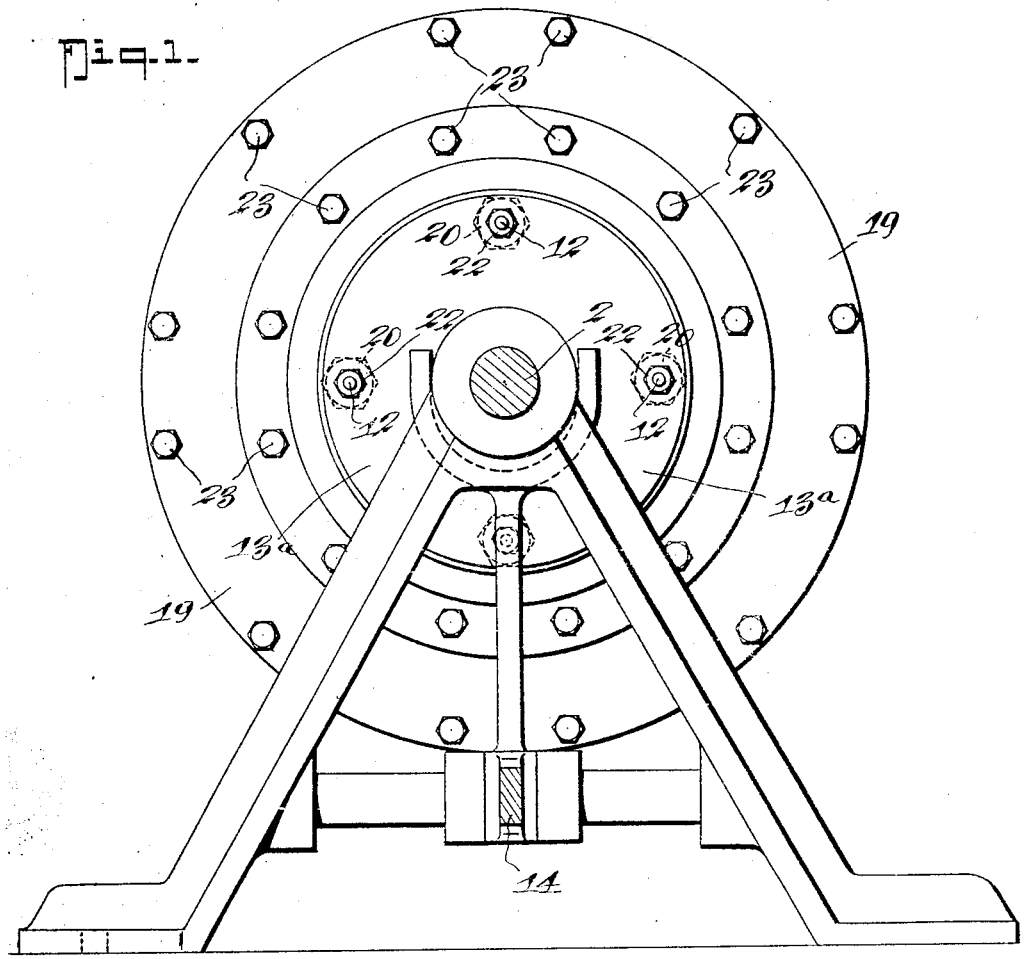
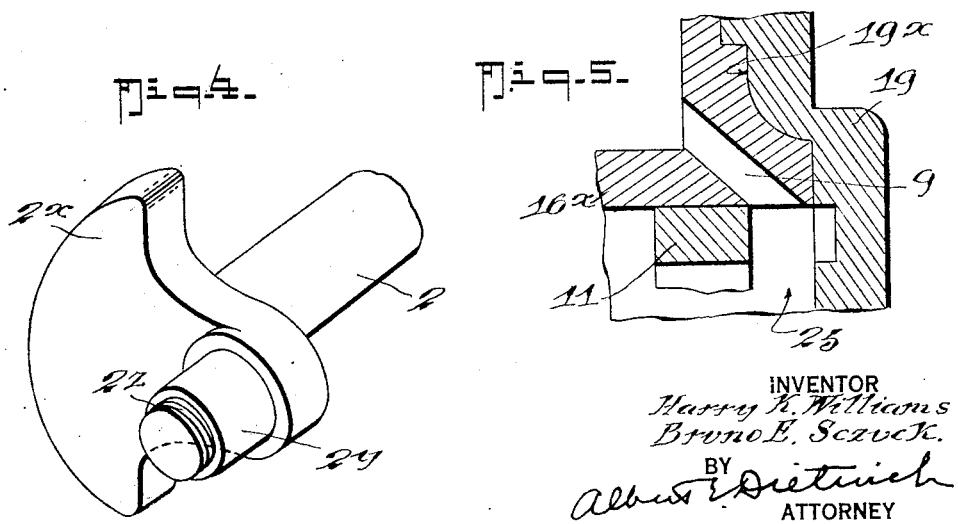
INVENTOR
Harry K. Williams
Bruno E. Sczuck.
BY Albert E. Dietrich
ATTORNEY

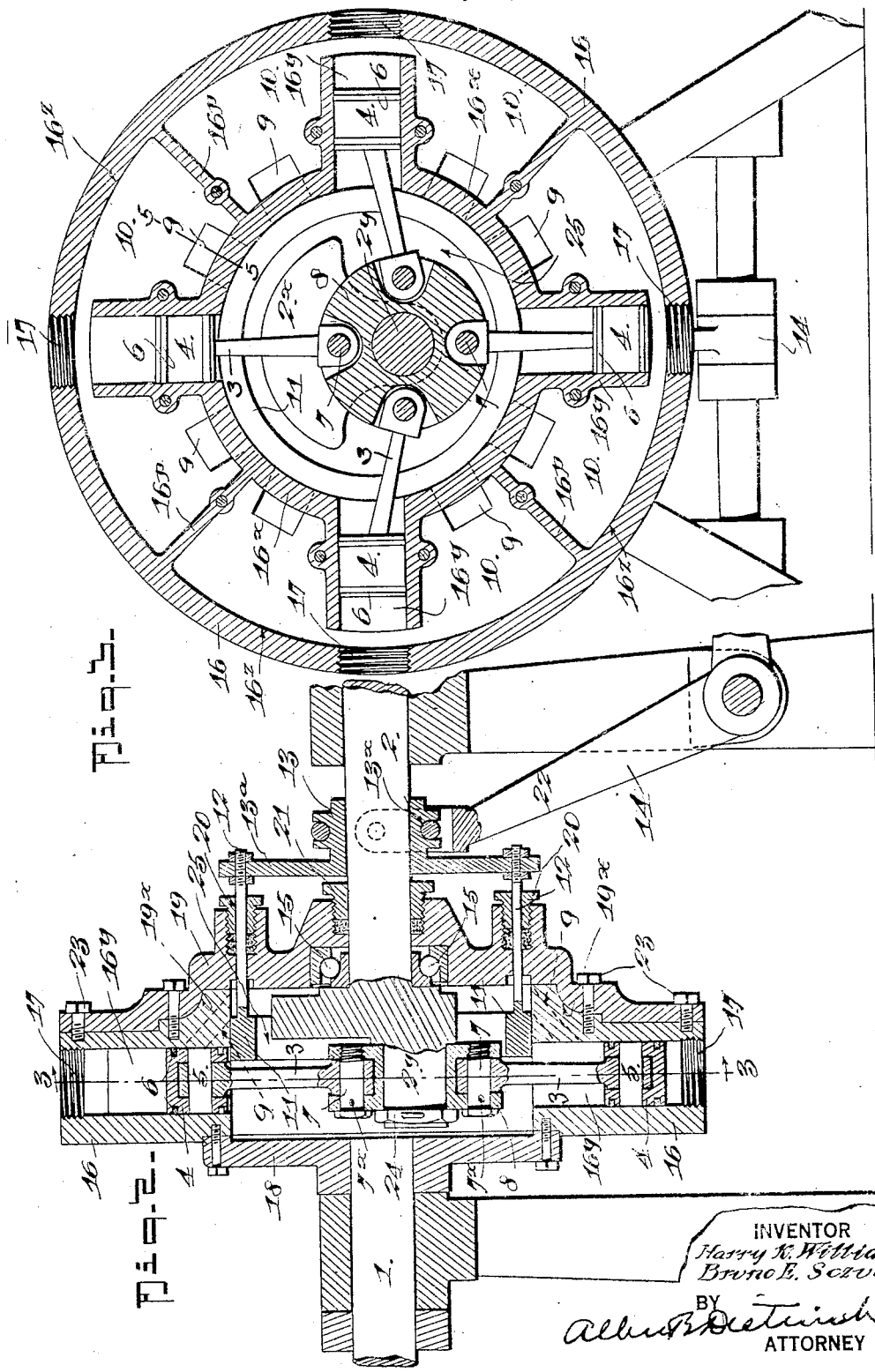

Patented Jan. 5, 1932

1,840,268

UNITED STATES PATENT OFFICE

HARRY K. WILLIAMS AND BRUNO EDOUARD SCZUCK, OF PORTLAND, OREGON

VARIABLE SPEED HYDRAULIC POWER TRANSMISSION MECHANISM

Application filed May 23, 1929. Serial No. 365,365.

The invention relates to mechanisms for transmitting power from a driving shaft to a driven shaft at variable speeds, and it particularly has for its object to do this by means that do not require the interposition of gearing.

Further, it is an object to provide a variable speed power transmission mechanism in which speed changes may be accomplished without mechanical shocks such as usually occur with sliding gear transmissions for example.

Further, it is an object to provide a variable speed power transmission mechanism in which all graduations of speed from zero to maximum may be obtained.

Further, it is an object to provide a variable speed power transmission mechanism involving incompressible liquid as a power conductor between two moving shafts.

Other objects will in part be obvious and in part be pointed out hereinafter.

To the attainment of the aforesaid objects and ends, my invention consists in the novel features of construction and in the combination, connection and arrangement of parts, hereinafter more fully described and then pointed out in the appended claims.

In the drawings:

Figure 1 is a front elevation of the invention.

Figure 2 is a central longitudinal section of the same.

Figure 3 is a vertical cross section on the line 3—3 of Figure 2.

Figure 4 is a detail perspective view of the crank end of the crank shaft.

Figure 5 is a detail section on the line 5—5 of Figure 3.

In the drawings, in which like numerals of reference indicate like parts in all of the figures, 1 represents the power or driving shaft which is key-connected or otherwise fixed to the transmission case cover flange 18, the latter being bolted to the transmission case 16, or otherwise suitably secured thereto.

2 represents the driven shaft which is journalled in suitable bearings 15 in the transmission case cover plate 19, a suitable packed gland 21 being provided to prevent liquid leakage from the transmission case.

The transmission case and cylinder block 16 is provided with a central annular ring-like portion $16x$ and radial partitions $16p$ to divide the case into a series of peripheral pockets or chambers 10, the cylinders $16y$ being cast integrally with the case 16 and annular partitions $16x$ as best shown in Figure 3 of the drawings.

The cylinders $16y$ have their outer ends terminate short of the peripheral line $16z$ of the transmission case so as to leave a passage to effect communication between the outer ends of the cylinders $16y$ and the chambers 10 for a purpose presently explained.

In order that the cylinders $16y$ may be bored and prepared for the pistons the peripheral line $16z$ of the transmission case 16 is provided with openings lining up with the cylinders, which openings are eventually closed by plugs 17 as shown.

The inner annular partition $16x$ is extended outwardly and formed with a seat $19x$ for the transmission case cover 19, the latter being bolted or secured in place with cap screws 23 as shown.

The extended portion of the annular partition $16x$ is provided with liquid by-pass ducts 9, one end of each of which communicates with the chambers 10 and the other end with the interior of the transmission case in the crank case compartment 25, through valve controlled openings governed by the ring valve 11 which is mounted to slide over said openings by means of rods 12 which pass through packed openings 20 in the transmission case cover 19 and are secured to a slide valve control disk $13a$ on a collar 13 that is slidable on the shaft 2 and in which collar the shaft 2 may freely turn, suitable adjustment nuts 22 being provided as indicated.

The collar 13 is slid along the shaft 2 for the purpose of operating the valve 11 by a suitable forked lever 14, the fork of which operates in a groove $13x$ in the collar 13, the lever being supported in any suitable way (not shown).

The shaft 2 is provided with a counterweight $2x$ and crank $2y$. On the crank there is mounted a connecting rod bearing 8 to which the connecting rods from the pistons 4 in the cylinders 16y are pivoted on the crank pins 7 carried by the bearing 8. The crank 2y has its outer end threaded as at 2z to receive a nut 24 which is pinned to the shaft to prevent its working loose. The connecting rod pins 7 are screwed into the bearing 8 and are also anchored by pins 7x as indicated.

The pistons 4 have pins 5 by which the connecting rods 3 are joined to the pistons and the pistons are provided with the usual packing rings 6.

The interior of the transmission case is completely filled wih a suitable liquid, such as oil for example. When power is applied to the shaft 1 and the ring valve 11 is moved to open all of the ports which it controls no rotation will be imparted to the shaft 2 since the oil will circulate or oscillate back and forth with the movements of the pistons in their cylinders. Upon closing the ports 9 more or less this flow of oil is retarded and consequently the movements of the pistons are retarded, thus imparting rotation to the shaft 2, the rotation reaching its maximum when the ports 9 have been entirely closed. Sudden shifting of the valve 11 (less than an entire closure) will not cause a metallic knock or clash to occur as in the case of suddenly shifted sliding gear transmissions because so long as the ports are open in a degree the flow of liquid will take place and the shock be taken up by the liquid column which is moving.

Other advantages of the invention will be clear to those skilled in the art.

What we claim is:

In a variable speed power transmitting mechanism, a rotatable housing comprising front and back walls, an outer peripheral wall, an inner circular wall and radial partitions between said walls dividing the housing into a plurality of chambers, piston cylinders carried by said inner circular wall, one cylinder projecting into each of said chambers with the outer end of the cylinder in open communication with the chamber into which it projects, said inner circular wall enclosing a crank case, front and back cover plates for said crank case, means for securing said front and back cover plates in place, shaft bearings, shafts mounted in said bearings, one of said shafts being secured to said housing, the other of said shafts being a crank shaft with a crank located in said crank case, pistons in said cylinders, connecting rods between said pistons and said crank shaft, one of said front and back walls having ports effecting communication between said chambers and the crank case through said inner circular wall, and a ring valve movable in the crank case along said circular inner wall for controlling the effective areas of said ports, and means for actuating said ring valve, a non-compressible liquid filling said housing for the purposes specified.

HARRY K. WILLIAMS.
BRUNO EDOUARD SCZUCK.